UNITED STATES PATENT OFFICE.

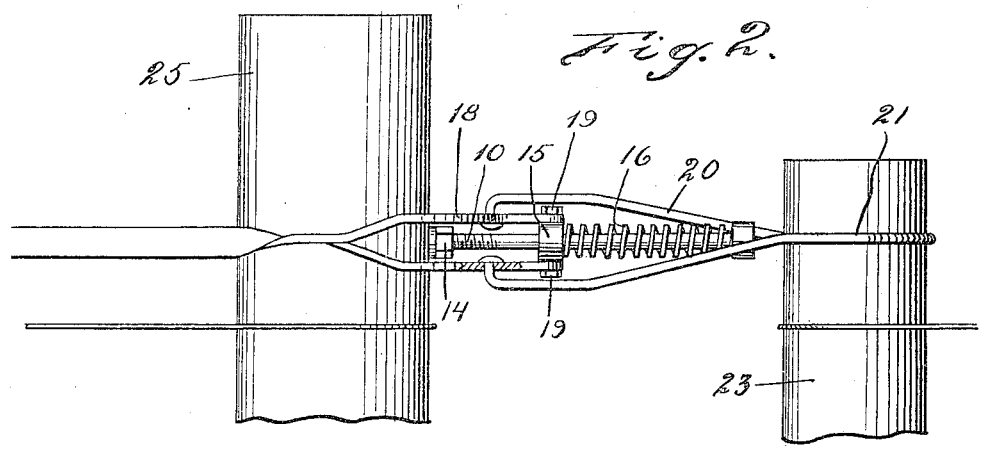
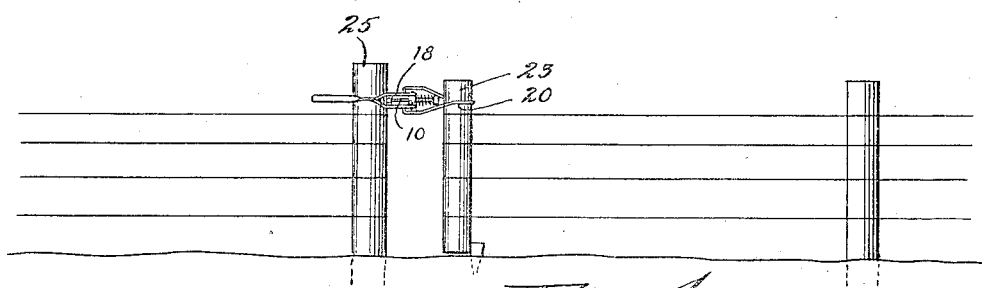
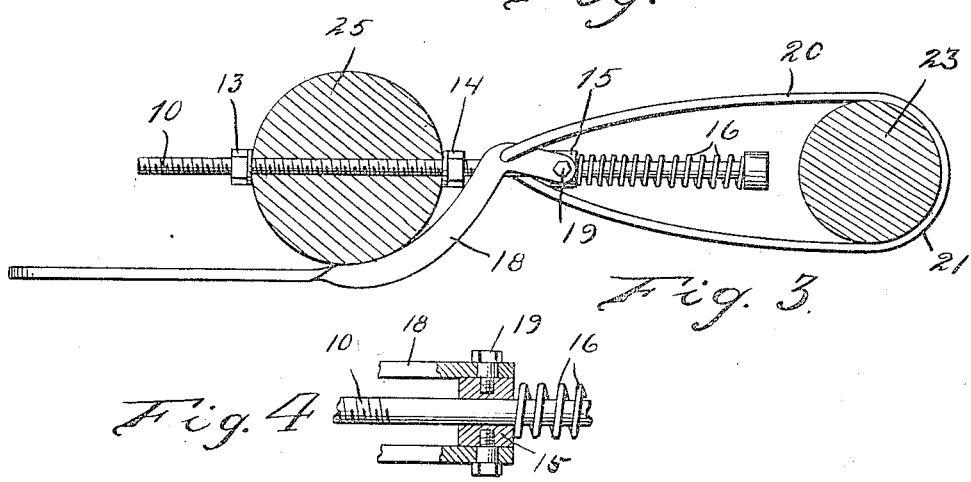

LEON T. BUTTOLPH, OF BUCKLIN, KANSAS.

GATE-FASTENER.

1,288,825.　　　　Specification of Letters Patent.　　Patented Dec. 24, 1918.

Application filed May 8, 1918.　Serial No. 233,298.

*To all whom it may concern:*

Be it known that I, LEON T. BUTTOLPH, a citizen of United States, residing at Bucklin, in the county of Ford and State of Kansas, have invented new and useful Improvements in Gate-Fasteners, of which the following is a specification.

This invention relates to a gate fastener, and the object is to provide a device which shall be especially useful in connection with that form of gate where a movable post is merely connected with the line wires of a fence, the gate structure comprising that portion of the line wires between one of the usual fence posts, and the movable post specified.

A further object is to provide a fastener of certain novel construction, including a bar adapted for permanent connection with one of the posts of the fence, this bar carrying a spring held and slidable member on which is mounted a lever, the lever having pivotal connection near its fulcrum with a bail member adapted to engage the upper end of the movable post of the gate.

With the foregoing and other objects in view the invention consists in the novel construction, combination, and arrangement of elements hereinafter described and claimed.

In the drawings,

Figure 1 is a side elevation.

Fig. 2 is a similar view of the fastener proper.

Fig. 3 is a top plan view.

Fig. 4 is a detail described below.

In carrying out my invention I employ a bar 10 threaded at one end and designed to pass through a stationary fence post, the threaded portion being engaged by nuts 13 and 14 which also engage opposite sides of the post. The bar carries a collar 15 slidably mounted and coöperating with a coil spring 16 mounted on the bar.

A fork lever 18 is fulcrumed at 19 on the collar 15 and is connected with a bail 20 at a point near the fulcrum. The U-shaped portion 21 of the bail is designed to pass over the upper end of the movable post 23 of the gate, and to retain the latter in position, closing the major portion of the opening between the two stationary posts 25 and 26.

The operation of the device is apparent and it need only be added that it is especially adapted to serve the purpose for which a fastener of this kind is intended.

What is claimed is:

1. In a device of the class described, a bar, a slidable collar carried thereby, a spring encircling the bar, and coöperating with the collar, a lever fulcrumed on the collar, and a bail member having its ends pivotally connected with the lever at a point adjacent to the collar.

2. In a device of the class described, a bar, and means for securing the latter to a fence post, a collar slidable on said bar, a forked lever and means for connecting the ends of the fork to the collar on opposite sides thereof, a spring coöperating with the slidable collar, a bail member having adjacent ends deflected toward each other, said deflected ends having pivotal connection with the lever at a plurality of points adjacent to the points of connection with the collar, the looped portion of the bail being adapted to receive and retain in position a post comprising one element of a gate.

In testimony whereof I affix my signature.

LEON T. BUTTOLPH.

Copies of this patent may be obtained for five cents each, by addressing the "Commissioner of Patents, Washington, D. C."